US010695959B2

(12) United States Patent
Murillo Y Pacifico et al.

(10) Patent No.: US 10,695,959 B2
(45) Date of Patent: Jun. 30, 2020

(54) METHOD FOR APPLYING A SEAL TO A PLATE

(71) Applicant: SPLIFAR, Fleurus (BE)

(72) Inventors: Candido Murillo Y Pacifico, Fleurus (BE); Giovanni Scagliola, Fleurus (BE)

(73) Assignee: Splifar, Fleurus (BE)

( * ) Notice: Subject to any disclaimer, the term of this patent is extended or adjusted under 35 U.S.C. 154(b) by 347 days.

(21) Appl. No.: 15/524,781

(22) PCT Filed: Nov. 5, 2015

(86) PCT No.: PCT/EP2015/075854
§ 371 (c)(1),
(2) Date: May 31, 2017

(87) PCT Pub. No.: WO2016/071468
PCT Pub. Date: May 12, 2016

(65) Prior Publication Data
US 2018/0009137 A1    Jan. 11, 2018

(30) Foreign Application Priority Data
Nov. 5, 2014    (BE) .................................. 2014/5051

(51) Int. Cl.
*B29C 39/26*    (2006.01)
*B29C 65/48*    (2006.01)
(Continued)

(52) U.S. Cl.
CPC .............. *B29C 39/26* (2013.01); *B29C 39/10* (2013.01); *B29C 41/08* (2013.01); *B29C 41/20* (2013.01);
(Continued)

(58) Field of Classification Search
None
See application file for complete search history.

(56) References Cited

U.S. PATENT DOCUMENTS 4,626,185 A * 12/1986 Monnet ............... B29C 33/0044
425/110
5,061,429 A * 10/1991 Yoshihara ........... B29C 33/0044
264/252

(Continued)

FOREIGN PATENT DOCUMENTS

EP    1361098 A1    11/2003
EP    1577080 A1    9/2005
FR    2875731 A1    3/2006

OTHER PUBLICATIONS

European Patent Office search report dated Jan. 20, 2016 re PCT Application No. PCT/EP2015/075854 of SPLIFAR.

*Primary Examiner* — Barbara J Musser
(74) *Attorney, Agent, or Firm* — Patrick J. Daugherty; Daugherty & Del Zoppo Co., LPA

(57) ABSTRACT

The invention relates to a method for applying a joint (2, 102) onto a plate (3), in particular a plate having shape defects. An edge of interest is defined on a portion of the plate (3) onto which the joint (2, 102) is intended to be applied. The plate (3) is then placed on a tool (4, 104) comprising a supporting element (5, 105) made of solid material and a supporting element (6, 106) made of flexible material, in such a way that the edge of interest rests on a portion of the supporting element made of flexible material. While the joint is applied onto the edge of interest, the plate is maintained in a predetermined reference position and the element made of flexible material is pushed against the plate, perpendicularly to an outer surface of the element made of flexible material, the outer surface being opposite to the surface on which the edge of interest rests.

10 Claims, 7 Drawing Sheets

(51) Int. Cl.
    *B29C 65/78*     (2006.01)
    *B29C 65/00*     (2006.01)
    *B29C 41/08*     (2006.01)
    *B29C 41/20*     (2006.01)
    *B29C 70/76*     (2006.01)
    *B29C 39/10*     (2006.01)
    *B29L 31/30*     (2006.01)
    *B29L 31/26*     (2006.01)
    *B29K 75/00*     (2006.01)
    *B29K 709/08*     (2006.01)

(52) U.S. Cl.
    CPC .......... *B29C 65/48* (2013.01); *B29C 65/7841* (2013.01); *B29C 66/1122* (2013.01); *B29C 66/474* (2013.01); *B29C 66/532* (2013.01); *B29C 66/71* (2013.01); *B29C 66/7465* (2013.01); *B29C 66/81264* (2013.01); *B29C 66/81423* (2013.01); *B29C 66/81431* (2013.01); *B29C 66/81451* (2013.01); *B29C 66/81457* (2013.01); *B29C 66/8242* (2013.01); *B29C 66/8322* (2013.01); *B29C 70/763* (2013.01); *B29C 66/82421* (2013.01); *B29K 2075/00* (2013.01); *B29K 2709/08* (2013.01); *B29L 2031/265* (2013.01); *B29L 2031/3052* (2013.01)

(56) References Cited

U.S. PATENT DOCUMENTS 5,645,785 A     7/1997   Cornils et al.
5,804,018 A *  9/1998   Fisher .................... B29C 43/18
                                                              156/245

* cited by examiner

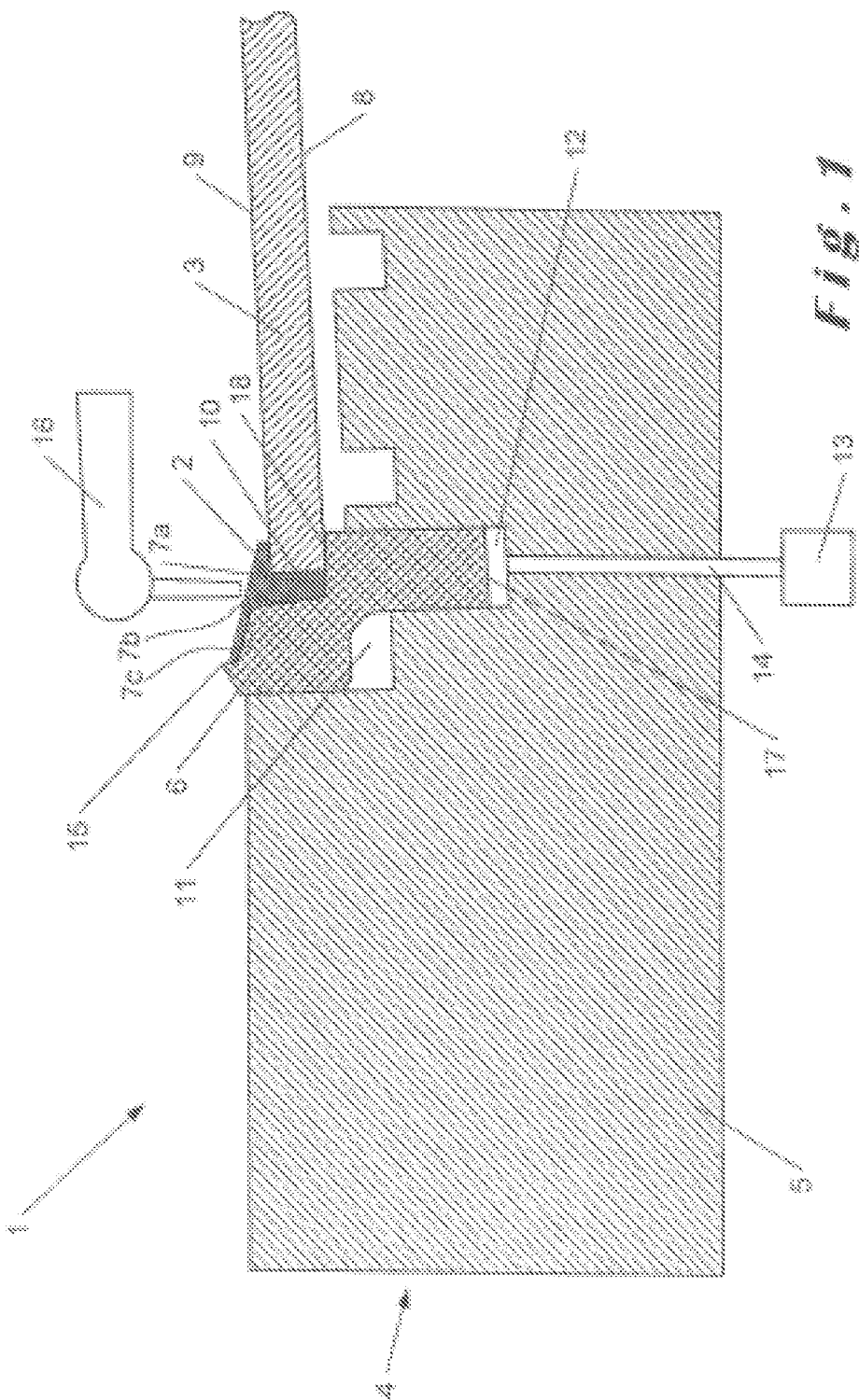

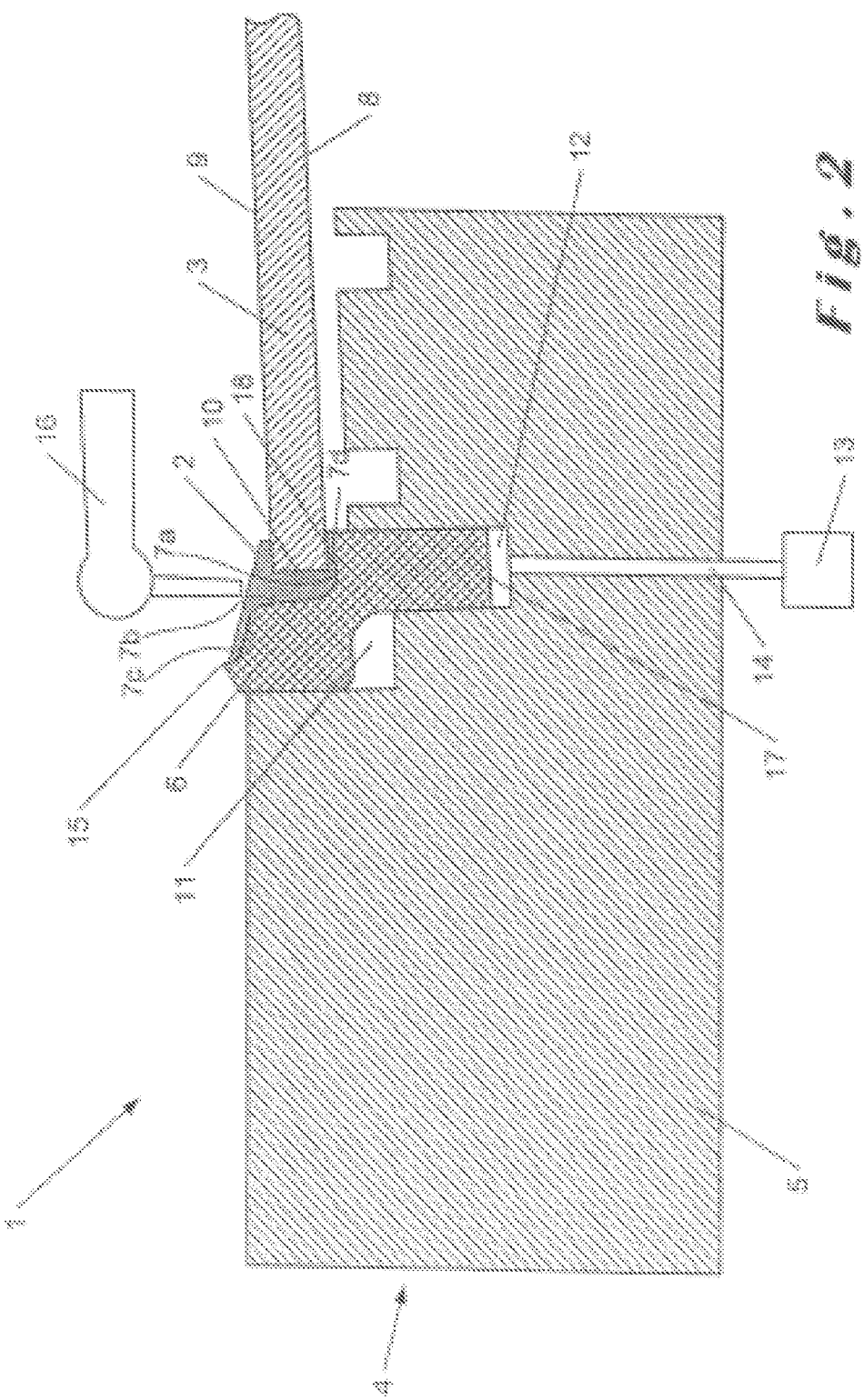

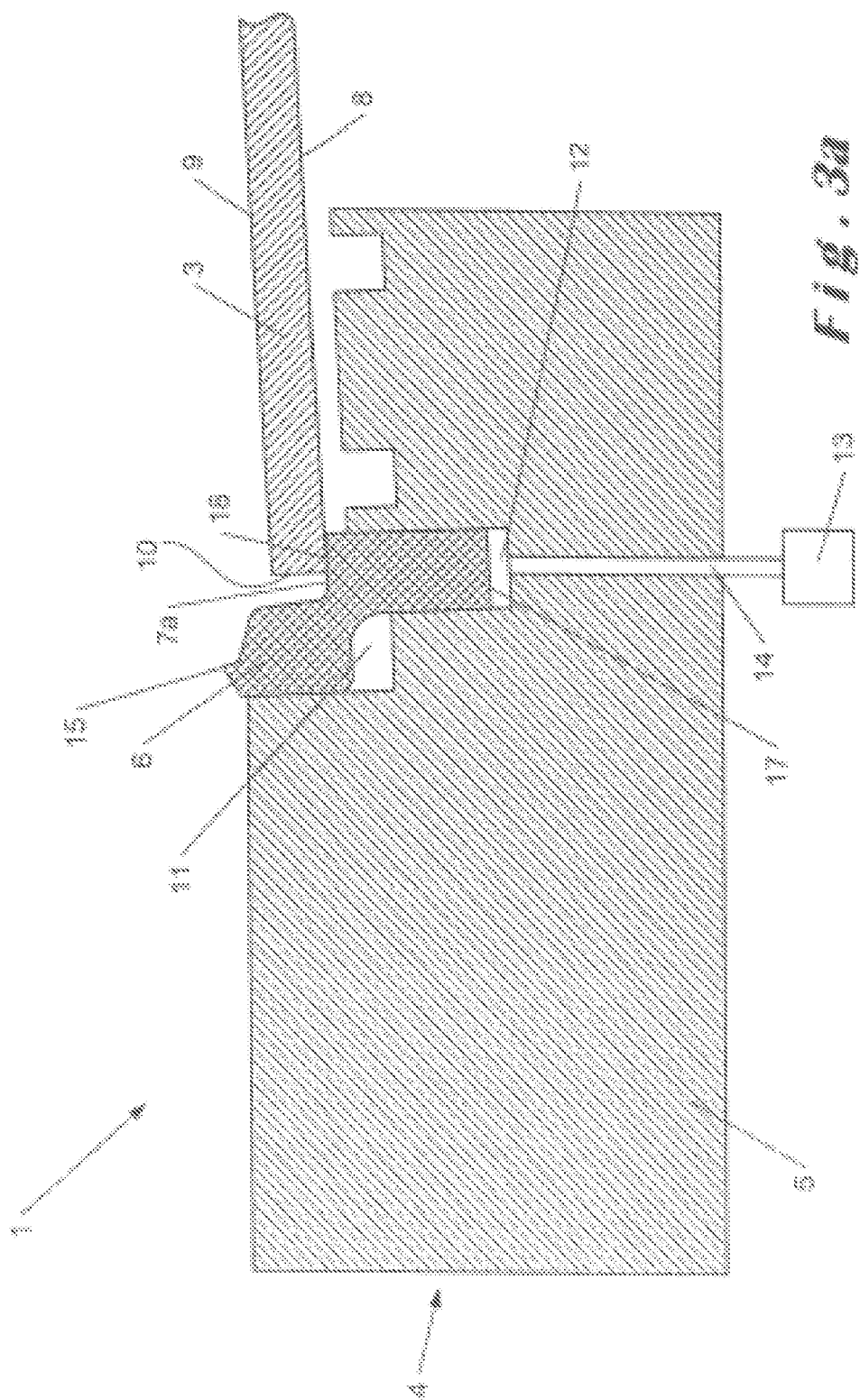

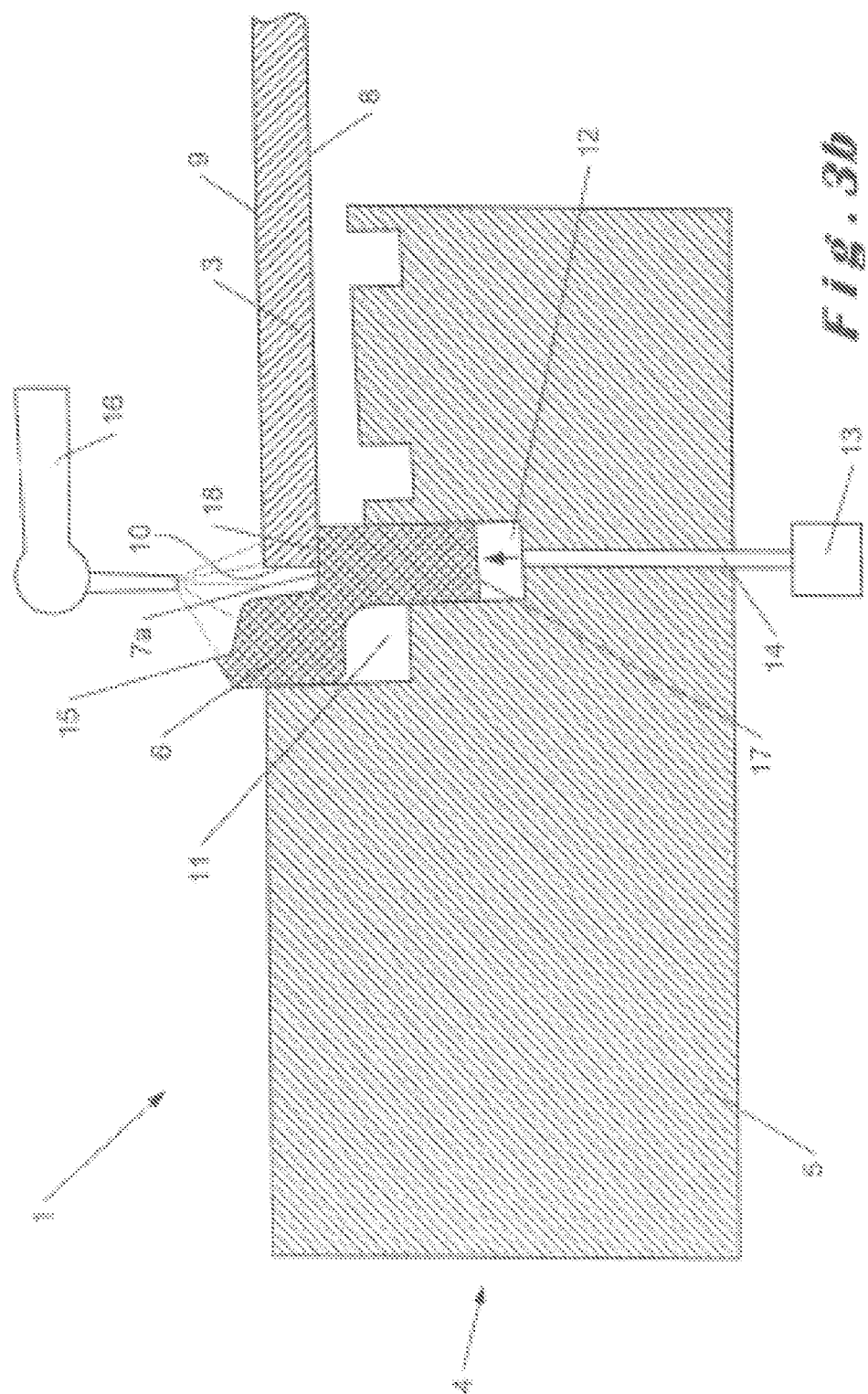

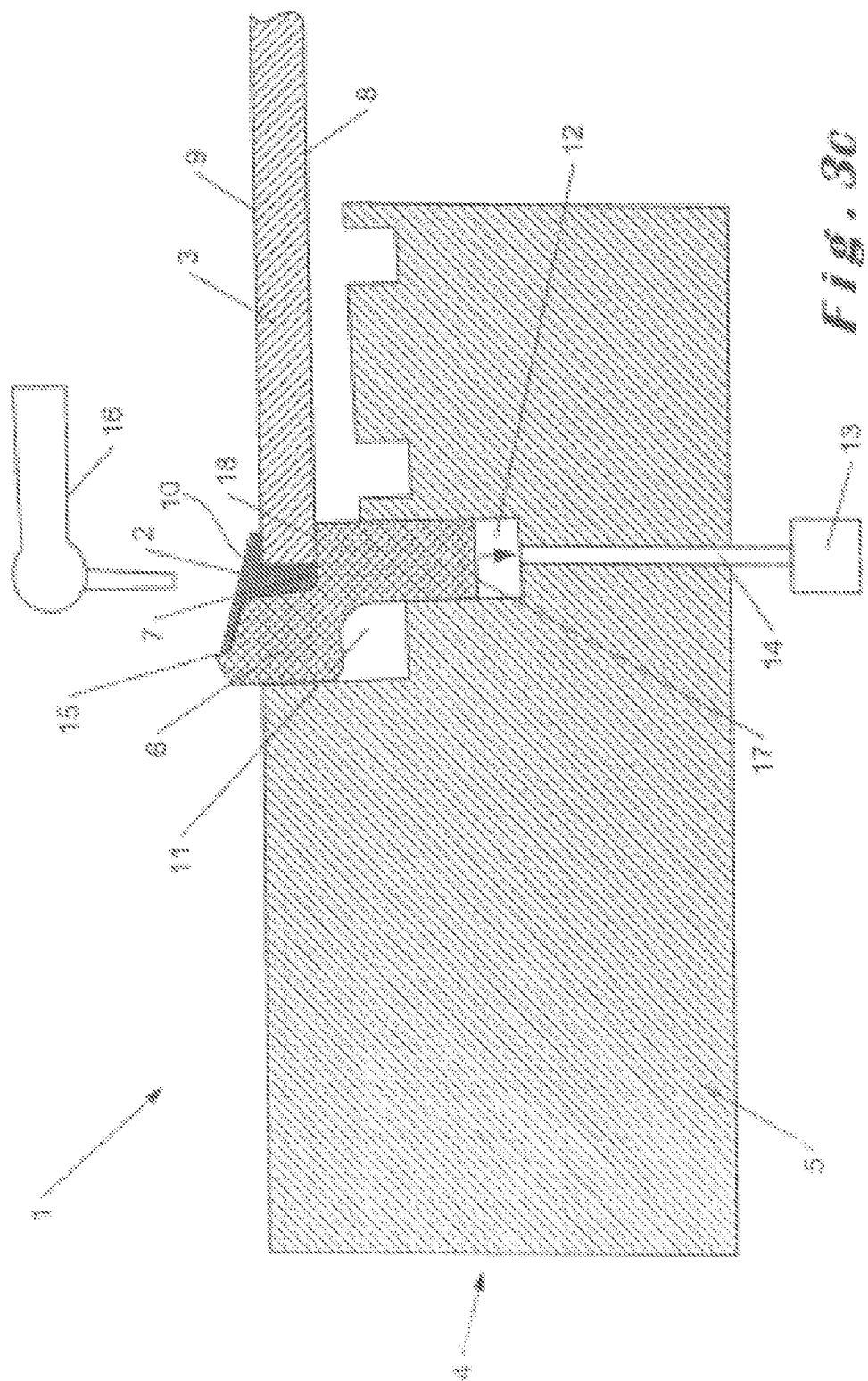

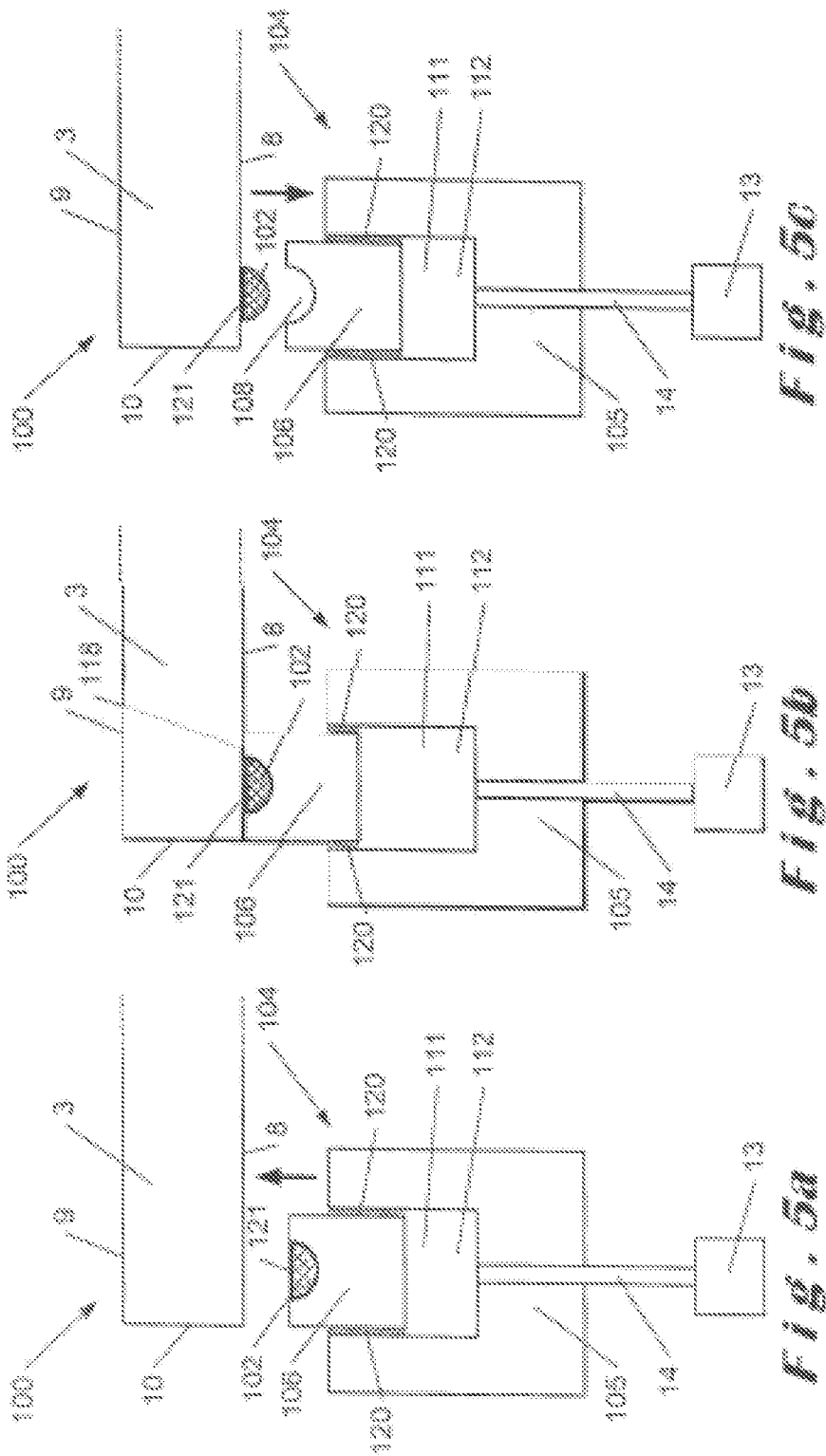

METHOD FOR APPLYING A SEAL TO A PLATE

The present invention relates to a method for applying a joint onto a plate, in particular a plate having shape defects, the method comprising the following steps:

providing a tool comprising at least a supporting element made of solid material and a supporting element made of flexible material, defining an edge of interest on a portion of the plate onto which the joint is intended to be applied, placing the plate on the tool in such a way that the edge of interest rests at least on a portion of the supporting element made of flexible material, maintaining the plate on the tool in a predetermined reference position, applying said joint onto the edge of interest, removing the plate and its applied joint from the tool.

Such a method is known from document EP 0 409 091. The plate is usually formed by a glass panel arranged to be mounted in a body of a vehicle. To mount the glass panel in a body, a joint extending along at least a portion of the edge of the panel is used.

A plurality of methods are currently used to apply a joint onto a plate.

An already-preformed joint can be glued or fitted onto the plate. European patent EP 1 361 098 describes a method for gluing a preformed joint onto a plate using an adhesive strip. The joint is pressed between the various portions of a flange and the plate is then pushed onto the joint.

Alternatively, the joint is produced directly on the plate either by the extrusion method or by an injection moulding method (RIM). European patent EP 1 577 080 describes a method for applying a joint onto a plate. A moulding method is proposed in which a hardenable composition is deposited on at least a portion of the surface of the tool. Contrary to the injection moulding method (RIM), the hardenable composition is not injected into a closed tool but is applied either directly or indirectly onto the plate and the surface of the tool via an application device moving along the edge of the plate while applying the hardenable composition onto it. In an open tool, the composition hardens after being applied when it is in contact with the ambient air. No pressure is exerted on the tool or on the applied composition. The surface of the tool can be made from a more flexible material, for example such as a silicone material. In general, the tool comprises two portions: a first supporting portion made of metal, provided with a groove into which a second flexible portion is inserted. The flexible portion is static and does not therefore exert any pressure on the plate when the hardenable composition is applied. The plate is then placed on the second flexible portion and rests on a contact surface.

It should be noted that the impermeability between the plate and the tool during the application or during the formation of the joint is important, regardless of the technique used. Indeed, the joint applied must be perfectly impermeable.

The techniques mentioned above are effective when the plate is perfectly smooth. However, despite all the precautions taken during the manufacturing of such plates, such as panes of glass for cars, the latter can have irregularities. In particular, the shapes of the panes of glass developed by automobile manufacturers are more and more complicated. Deviations can be measured in terms of variation in plate thickness or in terms of curvature, or also via the presence of local protrusions or notches. In reality, the plates are generally manufactured with a certain tolerance with respect to a reference shape.

However, the application of a joint is sensitive to the presence of local defects. Thus, there is a real need to have a method for applying a joint onto a plate that, in particular when the plate has shape defects or local defects, still allows the application of a sealing joint onto this plate.

For this purpose, the method according to the invention is characterised in that a pressure is exerted, during the application of the joint, and perpendicularly to an outer surface of the element made of flexible material, the outer surface being opposite to the surface on which the edge of interest rests in such a way that the element made of flexible material is pressed against the plate.

The exertion of a pressure on an element made of flexible material along the edge of interest pushes the latter against the plate, and in particular compensates for the shape defects present in the plate. Thus, there will be no leaks of material while the joint is applied, and the adhesion of the joint to the plate is continuous along the entire edge of interest.

In a first preferred embodiment according to the invention, said exerted pressure is at least equal to 0.5 bar.

Exerting this pressure has the advantage that the element made of flexible material is adequately pushed against the plate without the risk of the plate breaking.

In a second preferred embodiment according to the invention, the joint is produced by applying a hardenable composition via an applicator moving along the edge of interest.

A hardenable composition has the advantage that a joint is formed in a short period of time. The joint hardens while being partly in direct contact with the edge of the plate and with the element made of flexible material.

In a third preferred embodiment according to the invention, a reactive mixture containing polyurethane, formulated to produce an elastomer material containing polyurethane and having a density greater than 400 kg/m$^3$, is applied as the hardenable composition.

This has the advantage of ensuring the mechanical properties of the joint. Being a vehicle window, the plate provided with its joint can also be placed in the body of a vehicle and guarantee the impermeability of the panes of glass.

In a fourth preferred embodiment according to the invention, the joint is inserted into a recess provided in the element made of flexible material, said joint being provided with an adhesive substance along one side.

Placing a preformed joint into a recess provided in the element made of flexible material has several advantages. The joint provided with an adhesive substance is only in contact with the element made of flexible material, which means that the supporting element made of solid material undergoes less wear caused by the joint and by the adhesive substance. As indicated above, the element made of flexible material transfers the pressure exerted to glue the joint provided with the adhesive substance to the plate, and conforms to the shape of the plate along the edge of interest, thus ensuring uniform application of the joint along the edge of interest. Subsequent treatments, such as the application of a wheel onto the joint in order to finalise the adhesion of the joint to the plate, are no longer necessary.

In a fifth preferred embodiment according to the invention, an elastic material is used having a Shore A hardness of less than 90 at least on the surface of the element made of flexible material on which the plate rests.

An elastic material having a Shore A hardness of less than 90 has the advantage that the pressure that is exerted on an outer surface of the element made of flexible material can be transmitted to the contact surface. At the same time, the risk of the plate breaking remains very limited. In the context of the present invention, "the Shore A hardness scale" refers to the durometer hardness scale as defined by the standard ASTM D2240 (2010).

For a better understanding of the present invention, reference will now be made, as an example, to the appended drawings in which:

FIG. 1 is a transverse cross-sectional view of the device used in the method for applying a joint onto a plate using a hardenable composition.

FIG. 2 is a transverse cross-sectional view of the device used in the method for applying a joint onto a plate using a hardenable composition, wherein the tool comprises a recessed portion.

FIG. 3a is a transverse cross-sectional view of the device used with the plate placed on the tool in such a way that it rests on the supporting element made of flexible material.

FIG. 3b is a transverse cross-sectional view of the device used, wherein the hardenable composition is applied by a spraying method.

FIG. 3c is a transverse cross-sectional view of the device used after the joint is applied.

FIG. 5a is a transverse cross-sectional view of the device used with the preformed joint placed in a recess provided in the element made of flexible material, and provided with an adhesive material.

FIG. 5b is a transverse cross-sectional view of the device used, wherein a pressure is exerted that results in the element made of flexible material being pushed towards the plate.

FIG. 5c is a transverse cross-sectional view of the device used, wherein the exertion of the pressure is stopped when the joint adheres to the plate.

Figure 4:
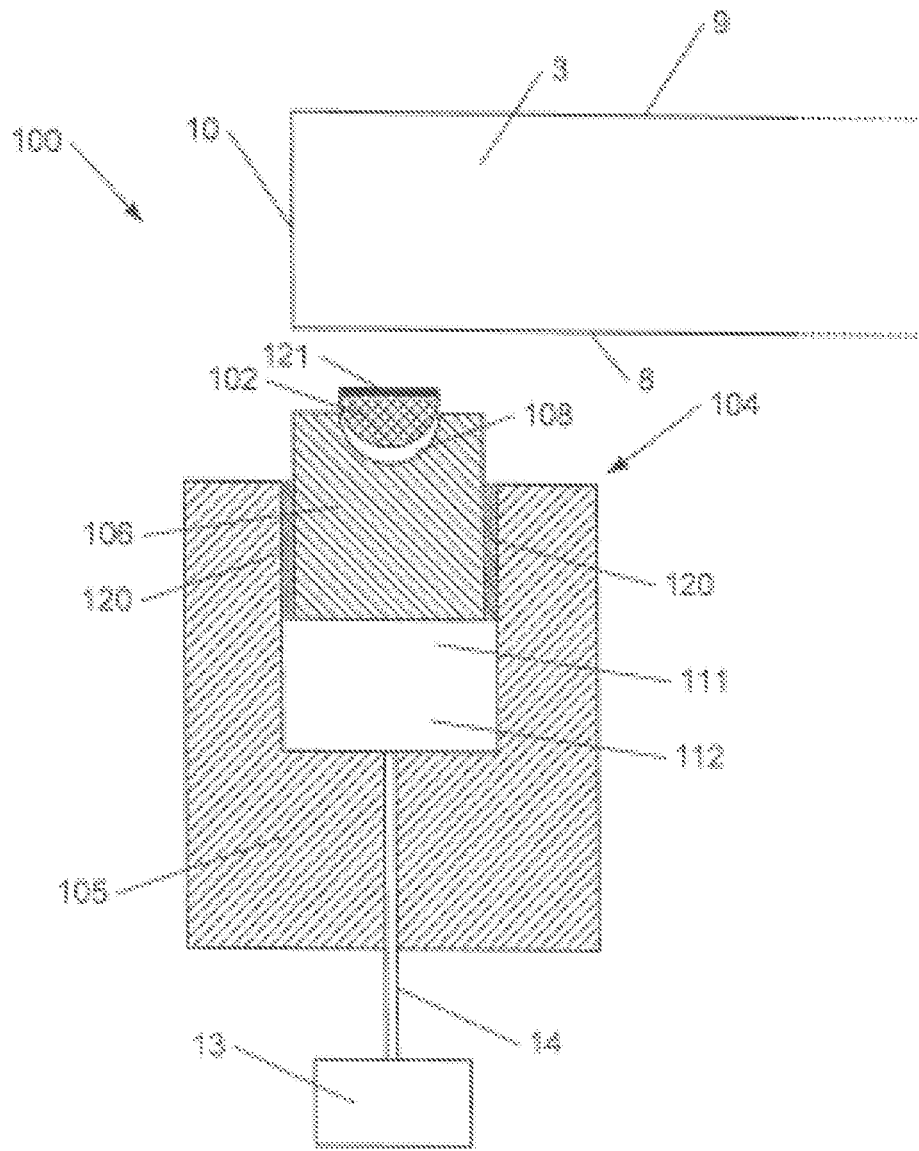
FIG. 4 is a transverse cross-sectional view of the device used in the method in order for a preformed joint to adhere to a plate.

In the drawings, identical or equivalent features have the same reference signs.

A joint is generally applied onto at least a portion of the contour of a plate and at least partially envelops the edges of the latter. In the specific case of a pane of glass for a vehicle, the joint is generally applied along at least one edge of the pane of glass in order to ensure impermeability when the pane of glass is inserted into the body of the vehicle. In the rest of the description, the edge of interest means the portion of the plate onto which the application of the joint is required for the future use thereof. Thus, the edge of interest can be a portion of the contour, the entire contour of the plate, or another portion of the plate or a joint must be applied. Moreover, the joint can be applied onto a single face, onto two faces of the plate and/or onto the peripheral edge face of the latter. The object of the present invention can be used in all of these cases. The term plate is used throughout the description. A plate can be a pane of glass, a pane of plexiglass, a solar panel, a synthetic or metal material or more generally any type of plate requiring a joint to be applied. Moreover, in the present invention, a joint can be an element allowing a function of impermeability between two elements to be carried out or a connection between two elements, but can also be a member placed on an element purely for cosmetic purposes.

FIG. 1 illustrates a first embodiment of the application of a joint 2 onto a plate 3. In this first embodiment, the joint 2 is produced by applying a hardenable composition via an applicator 16 that moves along the edge of interest of the plate 3. The joint 2 adheres to the plate after the application and the hardening of the composition on the edge of interest.

When a joint is applied onto a plate, the plate is generally placed on a tool, the dimensions of the surface of which are comparable to the dimensions of the plate. In the case of a windshield for a vehicle onto which a joint is applied along three edges, the tool will at least support the plate along the entirety of these three edges. A system for maintaining the plate on the tool in a predetermined reference position (not shown), such as suction cups, can be used to immobilise the plate 3 in its reference position.

FIG. 1 is a cross-sectional view of the tool 4 used to apply the joint 2. The tool 4 comprises a supporting element 5 made of solid material and an element 6 made of flexible material 6.

Preferably, the supporting element 5 made of solid material comprises a longitudinal recess 11 suitable for receiving the element 6 made of flexible material. This recess 11 preferably extends around the entire contour of the tool, like a groove, and can thus also completely or partially form a loop along the edge of interest of the plate when the latter is introduced into the tool. This tool is adapted for a predetermined plate shape. The tool 4 can, however, also comprise a plurality of separate linear sections along each side of the contour.

The element 6 made of flexible material comprises a leg and a head. The upper faces of the leg and of the head are positioned like the steps of a staircase. The face 7a corresponds to the upper face of the leg. Advantageously, the face 7c is the upper face of the head of the element 6 made of flexible material. The face 17 corresponds to the lower face of the leg.

The plate 3 comprises a first and a second face, respectively 8 and 9, opposite to each other and a peripheral edge face 10. The plate 3 is placed in the tool 4 in such a way that the edge of interest rests on the upper face 7a of the leg of the element 6 made of flexible material.

The shape of the recess 11 depends on the shape of the element made of flexible material and is preferably complementary to the shape of the element made of flexible material. In this embodiment, the recess 11 consists of two cavity portions, one being deeper than the other, wherein the shape of the cross-section of each is substantially rectangular, as illustrated in FIG. 1, in such a way that the deepest portion of the cavity is suitable for receiving the leg of the element made of flexible material and the least deep portion is suitable for receiving the head.

Preferably, the depth of the recess 11, or more specifically of the two cavity portions, is slightly greater than the height of the element 6 made of flexible material in such a way that the latter can slide and be inserted into the recess 11. Advantageously, the width of the recess 11 substantially corresponds to the width of the element 6 made of flexible material.

Advantageously, the recess 11 is dimensioned in such a way that the element made of flexible material cannot escape from the supporting element 5 made of solid material when the plate is inserted into the tool 4: the head of the element 6 made of flexible material rests against a wall of the recess 11, the leg is inserted sufficiently deeply into the deepest portion of the cavity, and the plate 3 rests on the upper face 7a of the leg. Of course, more sophisticated locking systems could be provided.

When the element 6 made of flexible material is inserted into the recess 11, a compensation chamber 12 is formed by the lower face and the walls of the deepest cavity of the recess 11 and the lower face 17 of the element 6 made of flexible material. The supporting element 5 comprises a duct 14 connecting the compensation chamber 12 to the outside of the tool, preferably to means 13 for exerting a pressure. The tool 4 supports the plate at least along the entire edge of interest. The element made of flexible material and the recess 11 extend at least along the edge of interest of the plate in the tool. A plurality of ducts 14 connecting the compensation chamber 12 to means 13 for exerting a pressure are positioned, at a distance from one another, in the tool.

In the example illustrated in FIG. 1, the means 13 for exerting a pressure advantageously comprise a pump allowing the injection and the extraction of a fluid such as a gas or a liquid. The pump is thus connected to the compensation chamber 12 via the duct 14.

In another embodiment, the means 13 for exerting a pressure comprise springs or bladders provided in the compensation chamber 12.

The arrangement of the plate 3, the element 6 made of flexible material and the applicator 16 determines the final shape of the joint. The applicator 16, which moves along the edge of interest of the plate 3, preferably applies the hardenable composition perpendicularly to the surface 7a on which the plate 3 rests. Thus, advantageously, the hardenable composition is deposited in the space located between the edge face 10 and the outer face 7b. The dimension of this space determines the dimension of the joint. When this space is filled, a portion of the hardenable composition is also deposited on the end of the face 9.

The surface 7c is preferably provided with a cutting edge 15. The cutting edge 15 comprises a sharp upper portion, the radius of curvature of which is preferably less than 1 mm. The cutting edge 15 is located beyond the peripheral edge face 10 of the plate 3, thus forming a first edge preventing the hardenable composition from flowing onto the supporting element 5. The hardenable composition that is deposited on the surface 7c upstream of the cutting edge 15 forms the lip of the joint. It is generally the lip that provides the seal when a pane of glass is installed in the body. Preferably, the surface 7c is not parallel to the surface 7a but rises in such a way as to prevent the hardenable composition from flowing onto the supporting element 5.

According to a second embodiment of the present invention illustrated in FIG. 2, the upper face 7a comprises a recess 7d such that the joint can also be applied onto the edge of the first face 8. Thus, the joint is applied not only onto the end of the face 9 and onto the peripheral edge face 10, but also onto the end of the face 8.

The hardenable composition is preferably applied using an applicator 16 such as a nozzle. For the present invention, various types of nozzles can be used to generate various flow configurations. For reference, an example of a suitable nozzle is described in document EP 1 577 080.

Preferably, the supporting element 5 made of solid material can be made of metal. Advantageously, the material of the element 6 made of flexible material comprises a deformable plastic, preferably a polymer or an elastomer, and even more advantageously a silicone. Preferably, the material of the element 6 made of flexible material must be chosen in such a way that when it is pushed against the plate 3, it is compressed against the plate in such a way as to make the contact surface 18 impermeable, even in the presence of deformations in the plate 3. Nevertheless, the material of the element 6 made of flexible material must also be sufficiently rigid for the pressure exerted on the latter to not deform the faces 7a, 7b, 7c and 7d. These two conditions on the rigidity of the element 6 made of flexible material ensure the absence of interstices between the element 6 made of flexible material and the edge of interest of the plate 3 while the joint 2 is applied, in such a way that the joint can be correctly formed on the edge of interest of the plate 3, without leaks of materials.

The upper face 7a can be made, at least partially, but preferably substantially totally from an elastic material having a Shore A hardness of less than 90, and more particularly less than 60. The element 6 made of flexible material can thus be, for example, made from a silicon material. Consequently, the element 6 made of flexible material can be easily produced via moulding in a master mould or via extrusion. Because of the elastic nature of the element 6 made of flexible material, the master mould does not need to be manufactured in a very precise way, and does not need to be refined in such a way that is costs less to manufacture.

FIGS. 3a, 3b and 3c illustrate the various steps required for applying a joint 2 onto a plate 3 in this embodiment of the invention. Preferably, the hardenable composition is applied via a pouring method using an applicator 16 provided with a nozzle.

Advantageously, in a first step not shown in the figures, the tool 4 is prepared and cleaned. The element made of flexible material 6 is inserted into the recess 11 of the tool 4, resulting in the formation of the compensation chamber 12 inside the tool 4. Advantageously, the plate 3 is also cleaned in order to improve the adhesion of the joint to the plate.

According to one embodiment of the present invention, the supporting element 5 made of solid material is heated to a temperature between 30 and 100° C., preferably between 45 and 75° C. This allows the speed of the hardening reaction, which is faster as temperatures greater than the ambient temperature, to be increased.

In a second step illustrated in FIG. 3a, the plate 3 is placed in the tool 4 in such a way that the plate 3 rests, at least at the edge of interest, on the upper face 7a of the element 6 made of flexible material. A contact surface 18 is thus created between the upper face 7a of the element 6 made of flexible material and the face 8 of the plate 3. However, the weight of the plate 3 is not sufficient to ensure impermeability along the entire contact surface 18.

However, as indicated above, irregularities or local deformations in the plate 3 can create local interstices between the upper face 7a and the edge of the plate 3. The impermeability between the plate 3 and the upper face 7a is required along the entire edge of interest for the application of the joint. This impermeability is necessary to prevent the leaking of material while the joint is applied.

In a third step shown in FIG. 3b, a pressure is exerted on the lower face 17 of the element made of flexible material in the compensation chamber 12. The pressure is exerted there using means 13 for exerting a pressure. The pressure exerted in the compensation chamber 12 is greater than the pressure of the ambient environment, which generally corresponds to atmospheric pressure.

This pressure generates a thrust of the element 6 made of flexible material in the direction of the plate 3. A counter-pressure is thus generated on the contact surface 18 between the plate 3 and the upper surface 7a of the element made of flexible material. This local counter-pressure generated on the contact surface 18 ensures local impermeability between the edge of the plate 3 and the element 6 made of flexible material. An improved seal is thus obtained, even in places comprising irregularities or local deformations, before deposition of the hardenable composition.

Preferably, in order to ensure this impermeability continuously along the edge of interest, the pressure is exerted locally at various predetermined locations. These locations can be equidistant or not and are dependent on the arrangement of the various ducts 14 along the support 5 made of solid material.

Advantageously, a lubricant is deposited between the walls of the leg of the element made of flexible material and the walls of the recess 11 in order to facilitate the sliding of the element made of flexible material 6 in the recess 11. The use of a lubricant also has the advantage that it prevents the flow of the fluid from the compensation chamber 12, in order to maintain the pressure in the compensation chamber 12 at a constant level or modify, in a stable manner, the pressure level without abrupt changes. The lubricant used can be, in particular, water or oil.

In a fourth step, illustrated in FIG. 3b, the joint 2 is produced by applying the hardenable composition via an applicator 16 that moves along the edge of interest.

The hardenable composition preferably comprises a reaction mixture of polyurethane, comprising a polyol and an isocyanate component. The hardenable composition is preferably formulated to produce an elastomer polyurethane material having a density greater than 400 kg/m$^3$ and preferably greater than 500 kg/m$^3$.

The hardenable composition can also be applied at ambient temperature, for example. However, in order to accelerate the hardening reaction, the hardenable composition is generally applied at a higher temperature, for example onto a heated surface. In one embodiment of the present invention, the supporting element 5 made of solid material of the tool 4 is made of metal and is heated to a temperature between 30 and 100° C., preferably between 45 and 75° C.

The totality of the surface can be coated with a layer of hardenable composition via multiple passes of the applicator 16, preferably via a maximum of two passes of the applicator 16, and more particularly by a single pass of the applicator 16.

In a fifth step illustrated in FIG. 3c, after the hardening of the hardenable composition, the means for exerting a pressure 13 are stopped, the pressure in the compensation chamber 12 is lowered, and the element 6 made of flexible material moves back down into the recess 11. The plate 3 and the joint 2 produced on said plate are then removed from the tool 4.

During the process of hardening, the hardenable composition is in contact with the upper face 7a of the element 6 made of flexible material, the peripheral edge face 10 of the plate 3, or with a gas. No additional external pressure is exerted on the joint 2 or on the element 6 made of flexible material.

The element 6 made of flexible material is visible from outside the device 1. Thus, a simple visual inspection allows the state of the element made of flexible material to be determined. If the element 6 made of flexible material requires replacement, it can be easily and quickly removed from the supporting element 5 made of solid material, without having to detach other elements. The wear on the tool will be limited to the element 6 made of flexible material that can be replaced. Indeed, during normal use, the joint does not come in contact with the supporting element made of solid material. The device 1 is therefore simple to maintain.

In a second embodiment of the invention, a preformed joint, is applied to the plate via an adhesive substance. The shape of the element made of flexible material and of the tool is different than in the previous embodiment, but the principle of the method is similar. The shape of the element made of flexible material is adapted to the shape of the preformed joint, which is applied via gluing. The preformed joint can be made of rubber, plastic material or elastomer.

FIG. 4 is a transverse cross-sectional view of a device 100 for applying a joint 102 onto a plate 3 according to this embodiment. FIG. 4 illustrates the tool 104 used to apply the joint 102. The tool 104 comprises a supporting element 105 made of rigid material and an element 106 made of flexible material. The supporting element 105 made of rigid material comprises a recess 111. The recess 111 is in the shape of a U and the element 106 made of flexible material is substantially rectangular. The dimensions of the recess 111 are adapted for the element 106 made of flexible material to be able to slide in the recess 111. Advantageously, the width of the recess 111 substantially corresponds to the width of the element 106 made of flexible material. Preferably, the depth of the recess 111 is slightly greater than the height of the element 106 made of flexible material in such a way that the latter can be inserted into the recess 111.

Like in the first embodiment of the present invention, the element 106 made of flexible material can then slide in the recess, upwards in order to move closer to the plate or downwards in order to move away from it. When the element 106 made of flexible material is inserted into the recess 111, a compensation chamber 112 is formed by the lower face and the walls of the recess 111 and the lower face of the element 106 made of flexible material. The means 13 for exerting a pressure and the duct 14 that connects the compensation chamber 112 to the means 13 for exerting a pressure are identical to the previous embodiment.

The shape of the element 106 made of flexible material depends on the shape of the preformed joint 102, and its upper face is preferably complementary to the shape of the preformed joint 102. In this embodiment, the preformed joint is in the shape of a half-cylinder as illustrated in FIG. 4. The element 106 made of flexible material thus comprises a longitudinal groove 108, the shape of which is a U and the dimensions of which are substantially the dimensions of the joint.

In this embodiment, the preformed joint is applied onto the first face 8 of the plate 3, as illustrated in FIG. 4.

A mechanical arm (not shown) can be used to position the preformed joint 102 in the groove 108. An adhesive 121 is applied onto the upper face of the joint intended to come into contact with the plate 3. Advantageously, this adhesive 121 is applied via means for applying an adhesive (not shown).

Preferably, a lubricant 120 is deposited between the element 106 made of flexible material and the supporting element 105 made of solid material in the recess 111. The use of a lubricant 120 has the advantage of preventing the flow of the fluid out of the compensation chamber 112, like in the first embodiment of the present invention.

FIGS. 5a, 5b and 5c illustrate various steps of the method for applying the joint according to an embodiment of the present invention.

The first step involves preparing and cleaning the tool 104. The element 106 made of flexible material is inserted into the recess 111, thus forming the compensation chamber 112. The joint 102 is placed into the longitudinal groove 108 of the element 106 made of flexible material, optionally using a mechanical arm. The adhesive is applied onto the face of the joint intended to come in contact with the plate 3 and forms a layer of adhesive 121 on this face. Preferably, the adhesive is applied onto the face of the joint after insertion of the joint into the longitudinal groove 108 of the element 106 made of flexible material. According to an alternative embodiment of the present invention, the joint can be inserted into the groove with the adhesive already applied onto its outer face.

The plate 3 is positioned in such a way that the edge of interest of the plate 3 is placed above the element 106 made of flexible material. In this embodiment, the first face 8 of the plate is placed above the tool, as illustrated in FIGS. 5a to 5c. This surface is preferably previously cleaned in order to improve the adhesion of the joint to the plate. An adhesive can also be previously applied onto the surface of the plate.

A pressure is exerted in the compensation chamber 112 using the means 113 for exerting a pressure. The element 106 made of flexible material is subjected to a force pushing it towards the plate 3, as indicated by the arrow in FIG. 5a. In another embodiment, it is also possible to push the plate towards the element made of flexible material.

In FIG. 5b, the element 106 made of flexible material and the joint 102 are against the plate, and a pressure is exerted along the entire contact surface 118 between the element made of flexible material provided with a joint and the plate. The contact surfaces 118 located on either side of the longitudinal groove that comprises the joint hermetically press the joint against the plate. Because of the element made of flexible material that exerts a pressure on the plate, the surface defects and the deformations of the plate 3 are no longer a constraint for the adhesion of the joint, said joint being in contact with the surface of the plate at every location. The joint takes the shape of the surface of the plate and the adhesive layer 121 acts at all points. The pressure in the compensation chamber is maintained for the time needed for the adhesive between the joint 102 and the plate 3 to act effectively.

Once the joint 102 adheres to the plate 3 via the adhesive 121, the element 106 made of flexible material can be removed from the plate 3 in the direction indicated by the arrow in FIG. 5c.

The invention claimed is:

1. Method for applying a joint onto a plate, in particular a plate having shape defects, the method comprising the following steps:
    providing a tool comprising at least a supporting element made of solid material and a supporting element made of flexible material, the supporting element made of solid material comprising a recess, the supporting element made of flexible material comprising a first face and a second face being opposite to said first face, said supporting element made of flexible material being located at least partially in said recess, a lower part of said supporting element made of flexible material being able to slide in between two walls of said recess;
    providing means for exerting a pressure in a compensation chamber of said recess, said compensation chamber being delimited at least partially by said second face of said supporting element made of flexible material;
    defining an edge of interest on a portion of the plate on which the joint is intended to be applied;
    placing the plate on the tool in such a way that the edge of interest rests at least on said first face of said supporting element made of flexible material;
    maintaining the plate on the tool in a predetermined reference position;
    applying said joint onto the edge of interest; and
    removing the plate and its applied joint from the tool;
    wherein a pressure is exerted, by said means for exerting a pressure, in said compensation chamber, on said second face during the application of the joint in such a way that the element made of flexible material slides upwards in the direction of the plate and pressed against the plate; and
    wherein the joint is produced by applying a hardenable composition via an applicator moving along the edge of interest.

2. Method according to claim 1, characterised in that said exerted pressure is at least equal to 0.5 bar.

3. Method according to claim 1, characterised in that a reactive mixture containing polyurethane, formulated to produce an elastomer material containing polyurethane and having a density greater than 400 kg/m3, is applied as the hardenable composition.

4. Method according to one of claims 1 to 2, characterised in that an elastic material is used having a Shore A hardness of less than 90 at least on the surface of the element made of flexible material on which the plate rests.

5. Method according to claim 1, wherein the supporting element made of solid material comprises a duct connecting the compensation chamber to the means for exerting a pressure.

6. Method according to claim 5, wherein the means for exerting a pressure comprise a pump allowing the injection of a fluid into the compensation chamber and the extraction of a fluid from the compensation chamber.

7. Method according to claim 1, wherein the edge of interest is part of a peripheral edge face of the plate.

8. Method for applying a joint onto a plate, in particular a plate having shape defects, the method comprising the following steps:
    providing a tool comprising at least a supporting element made of solid material and a supporting element made of flexible material, the supporting element made of solid material comprising a recess, the supporting element made of flexible material comprising a first face and a second face being opposite to said first face, said supporting element made of flexible material being located at least partially in said recess, a lower part of said supporting element made of flexible material being able to slide in between two walls of said recess;
    providing means for exerting a pressure in a compensation chamber of said recess, said compensation chamber being delimited at least partially by said second face of said supporting element made of flexible material;
    defining an edge of interest on a portion of the plate on which the joint is intended to be applied;
    placing the plate on the tool in such a way that the edge of interest rests at least on said first face of said supporting element made of flexible material;
    maintaining the plate on the tool in a predetermined reference position;
    applying said joint onto the edge of interest, and
    removing the plate and its applied joint from the tool;
    wherein a pressure is exerted, by said means for exerting a pressure, in said compensation chamber, on said second face during the application of the joint in such a way that the element made of flexible material slides upwards in the direction of the plate and pressed against the plate; and
    wherein the joint is inserted into a recess of the element made of flexible material, said joint being provided with an adhesive substance along one side.

9. Method according to claim 8, wherein the supporting element made of solid material comprises a duct connecting the compensation chamber to the means for exerting a pressure.

10. Method according to claim 9, wherein the means for exerting a pressure comprise a pump allowing the injection of a fluid into the compensation chamber and the extraction of a fluid from the compensation chamber.

\* \* \* \* \*